United States Patent
Wang

(10) Patent No.: US 12,529,552 B2
(45) Date of Patent: Jan. 20, 2026

(54) ANGULAR AVERAGING CALIBRATION ON BARE WAFER METROLOGY TOOLS FOR ESFQR MATCHING IMPROVEMENT

(71) Applicant: KLA Corporation, Milpitas, CA (US)

(72) Inventor: Haifeng Wang, Singapore (SG)

(73) Assignee: KLA Corporation, Milpitas, CA (US)

( * ) Notice: Subject to any disclaimer, the term of this patent is extended or adjusted under 35 U.S.C. 154(b) by 111 days.

(21) Appl. No.: 18/600,760

(22) Filed: Mar. 10, 2024

(65) Prior Publication Data

US 2024/0353219 A1    Oct. 24, 2024

Related U.S. Application Data

(60) Provisional application No. 63/460,145, filed on Apr. 18, 2023.

(51) Int. Cl.
*G01B 11/06*    (2006.01)
*G01B 9/02055*    (2022.01)
*G01B 21/04*    (2006.01)

(52) U.S. Cl.
CPC .......... *G01B 11/06* (2013.01); *G01B 9/02055* (2013.01); *G01B 21/045* (2013.01)

(58) Field of Classification Search
CPC ... G01B 9/02055; G01B 11/06; G01B 21/045
See application file for complete search history.

(56) References Cited

U.S. PATENT DOCUMENTS

| | | | |
|---|---|---|---|
| 8,269,981 B1* | 9/2012 | Doerband | G01B 11/2441 |
| | | | 356/512 |
| 8,949,057 B1* | 2/2015 | Seong | G01B 9/02007 |
| | | | 702/99 |
| 2006/0221348 A1 | 10/2006 | Deck | |
| 2014/0268172 A1* | 9/2014 | Salehpour | G01B 11/303 |
| | | | 356/511 |
| 2017/0045356 A1* | 2/2017 | Pandev | G01B 21/042 |
| 2020/0033117 A1 | 1/2020 | Huang et al. | |
| 2021/0149313 A1 | 5/2021 | Volkovich et al. | |
| 2021/0247178 A1 | 8/2021 | Zeng | |

(Continued)

OTHER PUBLICATIONS

International Search Report and Written Opinion for PCT/US2024/022906 mailed Jul. 25, 2024.

*Primary Examiner* — Michael P LaPage
(74) *Attorney, Agent, or Firm* — Entropy Matters LLC

(57) ABSTRACT

Methods and systems for generating a tool correction map are provided. One method includes measuring surface heights of front and back sides of first and second calibration wafers at multiple wafer rotation angles. The calibration wafers are low-shape wafers which show opposite shapes from each other when seen by the measurement apparatus, or they could be a single wafer but it is flipped in the measurement apparatus during the second measurement. The method also includes generating a first ("non-flipped") and a second ("flipped") correction map from the measured surface heights of the front and back sides of the first and second calibration wafers, respectively, at the multiple rotation angles. In addition, the method includes generating a tool correction map by averaging the non-flipped correction map and the flipped correction map and storing the tool correction map for use in calibrating a thickness map of a test wafer.

19 Claims, 5 Drawing Sheets

(56) References Cited

U.S. PATENT DOCUMENTS

| | | | |
|---|---|---|---|
| 2021/0366790 A1* | 11/2021 | Volkovich | ............... H01L 22/20 |
| 2021/0375651 A1 | 12/2021 | Wu et al. | |
| 2022/0099432 A1* | 3/2022 | Pylnev | ................... H10K 85/50 |
| 2022/0120559 A1 | 4/2022 | Zeng | |
| 2023/0244153 A1* | 8/2023 | Rogachevskiy | ......... G01C 5/00 |
| | | | 355/53 |
| 2024/0401931 A1* | 12/2024 | Tahara | ............... G01B 11/0691 |

* cited by examiner

ANGULAR AVERAGING CALIBRATION ON BARE WAFER METROLOGY TOOLS FOR ESFQR MATCHING IMPROVEMENT

BACKGROUND OF THE INVENTION

1. Field of the Invention

The present invention generally relates to methods and systems for angular averaging calibration to improve edge surface flatness quotient range (ESFQR) on bare wafer metrology tools.

2. Description of the Related Art

The following description and examples are not admitted to be prior art by virtue of their inclusion in this section.

Fabricating semiconductor devices such as logic and memory devices typically includes processing a specimen such as a semiconductor wafer using a number of semiconductor fabrication processes to form various features and multiple levels of the semiconductor devices. For example, lithography is a semiconductor fabrication process that typically involves transferring a pattern to a resist arranged on a semiconductor wafer. Additional examples of semiconductor fabrication processes include, but are not limited to, chemical-mechanical polishing, etch, deposition, and ion implantation. Multiple semiconductor devices may be fabricated in an arrangement on a semiconductor wafer and then separated into individual semiconductor devices.

Metrology processes are used at various steps during a semiconductor manufacturing process to monitor and control the process. Metrology processes are different than inspection processes in that, unlike inspection processes in which defects are detected on a specimen, metrology processes are used to measure one or more characteristics of the specimen that cannot be determined using currently used inspection tools. For example, metrology processes are used to measure one or more characteristics of a specimen such as surface flatness in the case of bare wafers such that the performance of the bare wafer manufacturing process can be determined from the one or more characteristics. In addition, if the one or more characteristics of the specimen are unacceptable (e.g., out of a predetermined range for the characteristic(s)), the measurements of the one or more characteristics of the specimen may be used to alter one or more parameters of the process such that additional specimens manufactured by the process have acceptable characteristic(s).

Metrology processes are also different than defect review processes in that, unlike defect review processes in which defects that are detected by inspection are re-visited in defect review, metrology processes may be performed at locations at which no defect has been detected. In other words, unlike defect review, the locations at which a metrology process is performed on a specimen may be independent of the results of an inspection process performed on the specimen. In particular, the locations at which a metrology process is performed may be selected independently of inspection results. In addition, since locations on the specimen at which metrology is performed may be selected independently of inspection results, unlike defect review in which the locations on the specimen at which defect review is to be performed cannot be determined until the inspection results for the specimen are generated and available for use, the locations at which the metrology process is performed may be determined before an inspection process has been performed on the specimen.

Edge surface flatness quotient range (ESFQR) is a metric in wafer metrology that describes the edge roll-off at various angular sectors of a wafer. Conventionally, it is generated in a dual-side wafer metrology device by measuring a surface height map of both sides of a wafer. A wafer thickness map is then calculated by adding up the two wafer surface maps and removing the apparent distance variation associated with the measurement apparatus. In some metrology tools, a "cavity map" (i.e., a distance map between two reference flats in a dual side interferometer) must be removed.

To calculate ESFQR, the thickness map of a wafer must be processed to extract the 2D thickness profile at defined angular sectors. An angular sector is a rectangular region in polar coordinates near the wafer edge. In some bare wafer metrology tools, it is defined with a radial length of 30 mm from the wafer edge and polar angle width of 5 degrees. In addition, edge exclusion (EE) is usually applied to remove low-quality data at wafer edge. 1 mm edge exclusion (1EE) and 0.5 mm edge exclusion (0.5EE) are the most common choices. Finally, at each angular sector, ESFQR is calculated as the "peak minus valley" distance of the 2D thickness profile after removing tilt. Intuitively, ESFQR describes how fast the wafer thickness is going down near the edge.

With 5-degree angular width, a wafer has 72 angular sectors, and so 72 ESFQR values are generated by each measurement, one for each angular sector. The actual ESFQR value depends on the choice of EE, and also the resolution of the thickness map. In some bare wafer metrology tools, ESFQR is usually calculated at standard resolution (StdRes) and high resolution (HiRes). With different combinations of EE and resolution, different groups of ESFQR can be generated.

There are however a number of disadvantages to the currently used bare wafer metrology methods and tools. For example, currently, ESFQR StdRes 1EE on some bare wafer metrology tools shows relatively large systematic error such that its matching has relatively high risk compared with other metrics. It is known that ESFQR matching between tools often presents a periodic pattern when plotted against angular sectors. The peak and valley of the pattern can often reach ~2 nm (0.42 nm is the matching specification for the mean of all angular sectors). The pattern is both tool-dependent and wafer-dependent. The contributing error sources for this matching error probably include (tool-specific) error in a cavity map (i.e., a distance map between two reference flats in a dual-sided interferometer), phase-dependent error due to laser power instability or vibration, which may be referred to as "fringe print through," wafer retrace error (RTE), which is dependent on tool aberration and wafer shape (more specifically, a phase error that depends on both optical aberration of the imaging system and wafer surface slope), and thickness error at wafer edge due to edge mismatch between front and back wafer maps. Without a way to address the root cause of the systematic error, ESFQR matching performance may not be able to support the needs of future generation tools.

Accordingly, it would be advantageous to develop systems and methods for generating a corrected thickness map that do not have one or more of the disadvantages described above.

SUMMARY OF THE INVENTION

The following description of various embodiments is not to be construed in any way as limiting the subject matter of the appended claims.

One embodiment relates to a system configured for generating a tool correction map. The system includes a metrology subsystem configured for measuring surface heights of front and back sides of first and second calibration wafers at multiple wafer rotation angles. (Note that a wafer that conforms to SEMI standard should carry a notch which can be used to define its rotation angle in the measurement apparatus.) The first and second calibration wafers are low-shape wafers having opposite shapes from each other as "seen" by the metrology subsystem (or also referred to herein as a "measurement apparatus"). In other words, the shapes of the first and second calibration wafers that are seen (or measured) by the metrology subsystem should be opposite to each other regardless of how the wafers are positioned in the metrology subsystem to achieve such shape opposition, which wafers are used for the measurements, and whether a single or multiple wafers are used for the measurements. One way to acquire such a pair of wafers is to find two wafers with similar shape, and then flip one of them in the wafer container so that its front and back side are interchanged when it's loaded into the measurement apparatus. Another possibility is that a single low-shape wafer can serve as both the first and second calibration wafer, but it needs to be flipped in the measurement apparatus such as a dual side interferometer when it is measured as the second calibration wafer. No matter which way one might choose to realize the method, the key is that the wafer seen by the measurement apparatus during the first and second measurement should present opposite shapes.

The system also includes a computer subsystem configured for generating two ("first" and "second") correction maps from the measured surface heights (or thickness maps) at multiple rotation angles of the front and back sides of the first and second calibration wafers, respectively. Since the second calibration wafer can be the flipped version of the first calibration wafer, the correction maps generated from the first and second calibration wafers are referred to as a "non-flipped correction map" and a "flipped correction map", respectively. In addition, the computer subsystem is configured for generating a tool correction map by averaging the first and second correction maps. The computer subsystem is further configured for storing the tool correction map for use in calibrating a thickness map of a test wafer generated from surface heights of front and back sides of the test wafer measured by the metrology subsystem. The system may be further configured as described herein.

Another embodiment relates to a computer-implemented method for generating a tool correction map. The method includes the measuring step described above performed with a metrology subsystem configured as described above. The calibration wafers are configured as described above. The method also includes generating a first correction map, a second correction map, and a tool correction map, and storing the tool correction map as described above, which are performed by a computer subsystem. Each of the steps of the method may be performed as described further herein. The method may include any other step(s) of any other method(s) described herein. The method may be performed by any of the systems described herein.

Another embodiment relates to a non-transitory computer-readable medium storing program instructions executable on a computer system for performing a computer-implemented method for generating a tool correction map. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
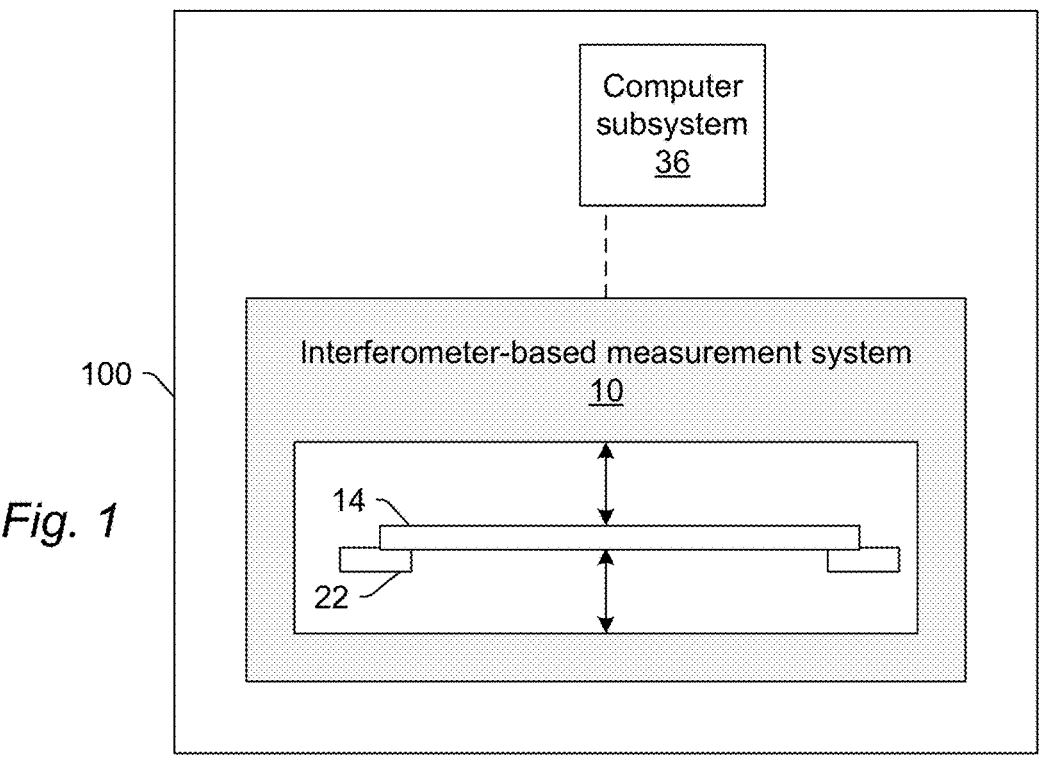
FIG. 1 is a schematic diagram illustrating a side view of an embodiment of a system configured for generating a tool correction map.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are configured for angular averaging calibration on metrology tools for edge surface flatness quotient range (ESFQR) matching improvement. During investigation of ESFQR matching error, a calibration method has been developed to remove the tool-specific, angle-dependent systematic error in standard resolution ("StdRes") thickness maps on metrology tools, which is also referred to herein as "angular averaging calibration." This calibration method works well in improving ESFQR StdRes, 1 mm edge exclusion ("1EE") matching, and there is also interest to extend this method to ESFQR high resolution ("HiRes") 0.5 mm edge exclusion ("0.5EE"). The principle of this calibration method is described below.

One embodiment of a system configured for generating a tool correction map includes a metrology subsystem configured for measuring surface heights of front and back sides of first and second calibration wafers at multiple wafer rotation angles. For example, as shown in FIG. 1, system 100 includes interferometer-based measurement system 10, which is configured for measuring surface heights of front and back sides of wafer 14 at multiple wafer rotation angles. Interferometer-based measurement system 10 may be configured as a Fizeau interferometer type measurement system. For example, the measurement system may be configured as described in U.S. Patent Application Publication No. 2020/0033117 to Huang et al. published Jan. 30, 2020, which is incorporated by reference as if fully set forth herein. The metrology subsystem may be further configured as described in this publication. The metrology subsystem may also include a commercially available metrology subsystem like those in WaferSight™ tools that are commercially available from KLA Corp., Milpitas, Calif.

The metrology subsystem may be warmed up in any suitable manner known in the art before any of the measurements described herein, e.g., prior to measurement of the correction map. The multiple wafer rotation angles in degrees may be, for example, 0, 30, 60, 120, 150, 180, 210, 240, 300, and 330. There may therefore be 10 angles in total. However, any suitable wafer rotation angles and any suitable number of such angles may be used in the embodiments described herein. The metrology subsystem may measure the surface heights at the wafer rotation angles in any suitable manner known in the art.

The metrology subsystem may also include a scanning subsystem configured to change the position on the wafer at which the measurements are performed and possibly to scan the wafer during the measuring. For example, the metrology subsystem may include stage 22 on which wafer 14 is disposed during metrology. As shown in FIG. 1, the stage may support the wafer near the edges of the wafer and not in the central portion of the wafer so that back side of the wafer can be measured by the metrology subsystem. The stage may be in contact with the edge of the wafer over the entire periphery of the wafer or only in certain spaced apart areas around the periphery of the wafer. The scanning subsystem may include any suitable mechanical and/or robotic assembly (that includes stage 22) that can be configured to move the wafer such that the measurements can be performed at different positions on the wafer. In addition, or alternatively, the metrology subsystem may be configured such that one or more optical elements of the metrology subsystem perform some scanning of the wafer.

The system also includes a computer subsystem, e.g., computer subsystem 36, configured to perform one or more functions described herein using output generated by the metrology subsystem. For example, computer subsystem 36 may be coupled to detectors (not shown) of the metrology subsystem in any suitable manner (e.g., via one or more transmission media, which may include "wired" and/or "wireless" transmission media) such that the computer subsystem can receive output generated by the detectors. Computer subsystem 36 may be further configured as described herein.

Computer subsystem 36 may also be referred to herein as a computer system. The computer subsystem may take various forms, including a personal computer system, image computer, mainframe computer system, workstation, network appliance, Internet appliance, or other device. In general, the term "computer subsystem" may be broadly defined to encompass any device having one or more processors, which executes instructions from a memory medium. The computer subsystem may also include any suitable processor known in the art such as a parallel processor. In addition, the computer subsystem may include a computer platform with high speed processing and software, either as a standalone or a networked tool.

In one embodiment, the metrology subsystem is configured for measuring the surface heights of the front and back sides of the first and second calibration wafers at a standard resolution. For example, experimental results used to create the embodiments described herein included only StdRes thickness maps. However, the same calibration principle should be applicable to thickness maps at other resolutions such as HiRes. The calibration of thickness maps at different resolutions could have differences in operation details depending on the system. For example, in some wafer metrology systems, StdRes thickness maps are saved in standard wnt/pwg files and can be modified and replaced easily. But, HiRes thickness maps are usually not saved directly, although they can be calculated from front and back height maps when needed. Therefore, StdRes and HiRes applications of the embodiments described herein may be somewhat different in practice, but the overall concept is generally independent of the resolution at which the measurements are performed. In another option, the computer subsystem may be configured to extract HiRes thickness maps. A HiRes correction map can also be calculated first and then downsampled to get the StdRes correction map.

The first and second calibration wafers are low-shape wafers. In one embodiment, the low-shape wafers have shape $6\sigma$ less than 9500 nm, and $6\sigma$ of a sum of shape maps of the first and second calibration wafers is less than 2200 nm. For example, the calibration wafers described herein are preferably low-shape because if the wafers are high-shape wafers, the correction maps generated as described herein may carry significant wafer signature. Experimental results show that calibration wafers with shape $6\sigma$ less than about 9000 nm can work well. In this manner, the term "low-shape wafers" as that term is used herein is defined as wafers having shape $6\sigma$ less than 9500 nm.

The first and second calibration wafers also have opposite shapes from each other as seen by the metrology subsystem. In this manner, the method includes creating a correction map using two opposite-shaped calibration wafers as the shapes of the calibration wafers are seen by the metrology subsystem. First and second calibration wafers having opposite shapes from each other as seen by the metrology subsystem may be identified and selected as described further herein.

In one embodiment, the first and second calibration wafers are standard bare wafers. The standard bare wafers may include any suitable such wafers known in the art. In another embodiment, the computer subsystem is configured for selecting the first and second calibration wafers from a single batch of wafers and based on shape of the wafers in the single batch. For example, in reality, it is difficult to find two wafers with exactly opposite shape. During early tests performed to create the embodiments described herein, the same wafer was flipped to generate the flipped correction map. For practical implementation, two wafers of similar shape are preferred with flipping one of them to prepare a "calibration wafer pair." Note that flipping the wafer also does a mirror image operation on the wafer shape. Therefore, it is better to use wafers with almost symmetrical shape about the diameter through notch. Experimental results have shown that it is not so difficult to find such similar-shaped wafers among the same batch of wafers from vendors such as Wafernet Inc., San Jose, Calif. and Siltronic, Munich, Germany. Therefore, the term "opposite shapes" as used herein is defined as two wafer shapes that are sufficiently opposite from each other that they meet the criteria described further herein. As such, the shapes of the calibration wafers do not have to be exactly opposite from each other to be suitable for use in the embodiments described herein as long as they meet the criteria described herein.

In another embodiment, the computer subsystem is configured for selecting the first and second calibration wafers by determining a difference shape map from shape maps for different pairs of wafers and selecting one of the different pairs with 6σ of the difference shape map less than 1500 nm. For example, the computer subsystem may be configured for selecting the first and second calibration wafers by determining a difference shape map from shape maps of a pair of wafers before flipping one of them, and the passing criteria is that the 6σ of the difference shape map is less than 1500 nm. Then, one of the wafers is flipped upside down thereby becoming a pair of calibration wafers (also referred to herein as Wafer A and Wafer B).

In summary, the criteria to select the wafer pair (before flipping) from a batch of similar wafers is:
 1. The 6σ of the shape map of both wafers is less than 9000 nm; and
 2. The 6σ of the difference shape map between the two wafers before flipping is less than 1500 nm.

Figure 4:
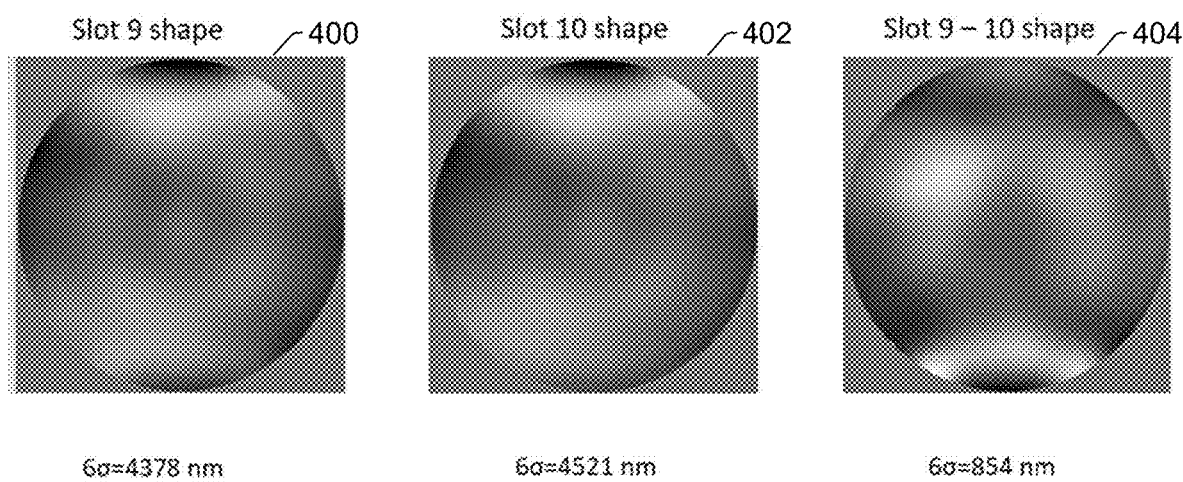
FIG. 4 is a schematic diagram illustrating an example of a valid wafer pair with similar shape, before the second wafer is flipped.

An example of a valid wafer pair with similar shape before flipping one of the wafers is shown in FIG. 4. In particular, FIG. 4 shows shape map 400 of a wafer that is in slot 9 of a lot having 6σ=4378 nm. Shape map 402 is for a wafer that is in slot 10 of the same lot having 6σ=4521 nm. Subtraction of the two shape maps (i.e., Slot 9 shape-Slot 10 shape) yields shape map 404 having 6σ=854. Therefore, these two wafers meet the criteria identified above and may be selected for use as the first and second calibration wafers after flipping one of them.

In an additional embodiment, the computer subsystem is configured for verifying a pair of wafers selected as the first and second calibration wafers by determining the sum of shape maps for the pair of wafers after flipping one of the shape maps for one of the wafers in the pair (e.g., about the diameter through notch) and determining if 6σ of the sum of the shape maps for the pair of wafers is less than 2200 nm. The passing criteria for verifying the calibration wafer pair are:
 1. The 6σ of the shape map of both wafers is less than 9500 nm; and
 2. The 6σ of wafer A shape+horizontal flip of wafer B shape is less than 2200 nm.

Figure 6:
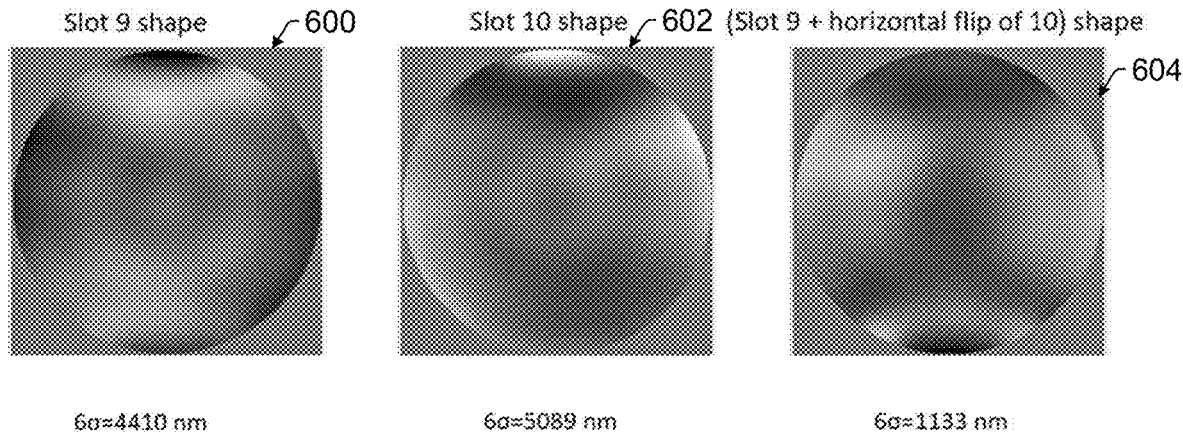
FIG. 6 is a schematic diagram illustrating an example of a valid calibration wafer pair.

An example of a valid calibration wafer pair is shown in FIG. 6. Shape map 600 is for a wafer that is in slot 9 of a lot having 6σ=4410 nm, and shape map 602 is for a wafer in slot 10 of the lot having 6σ=5089 nm. Addition of the first shape map and the horizontally flipped second shape map (i.e., slot 9 wafer shape map+horizontal flip of slot 10 wafer shape map) results in shape map 604 having 6σ=1133 nm. Therefore, these two wafers meet the criteria identified above and are a valid pair of calibration wafers. Note that the second map is flipped horizontally because the wafer notch is at the bottom of the figure. The diameter through the notch is vertical which is the flipping axis.

The computer subsystem may be configured for generating and displaying to a user the shape maps of one or more pairs of wafers. For example, in some embodiments, the computer subsystem is configured for generating shape maps for the first and second calibration wafers and displaying to a user the shape maps for the first and second calibration wafers and one or more of a difference shape map generated from the shape maps for the first and second calibration wafers and a sum of the shape maps for the first and second calibration wafers. The computer subsystem may be configured for performing operations such as map flipping, map summation and map subtraction and displaying the 6σ of the resultant maps to a user. For example, the computer subsystem may be configured with a display device and/or a user interface to display such wafer shape maps and one or more results generated by adding or subtracting the wafer shape maps, possibly in a manner similar to that shown in FIGS. 4 and 6. This functionality is of course optional but may visually provide assurance to the user that the shape maps are similar enough and/or the addition and/or subtraction results are suitable. This functionality may also be optionally provided with a user input mechanism so that a user can confirm or reject a pair of wafers as the calibration wafers.

The computer subsystem is configured for generating a first ("non-flipped") correction map from the measured surface heights of the front and back sides of the first calibration wafer at the multiple wafer rotation angles. The wafer rotation angles at which the surface heights are measured may be the rotation angles described above, for example, 0, 30, 60, 120, 150, 180, 210, 240, 300, and 330. This is just an example however. Any suitable wafer rotation angles and any suitable number of such angles may be used. The key is that the average thickness map from thickness maps of these rotations should be essentially radially symmetric, i.e., any angular dependent feature in the individual thickness maps is preferably suppressed by averaging. The wafer rotation angle used for selecting the calibration wafers may be one of the wafer rotation angles used for generating the correction maps described herein, but 0-deg is the most convenient choice. Generating the non-flipped correction map may be performed as described further herein.

Figure 2:
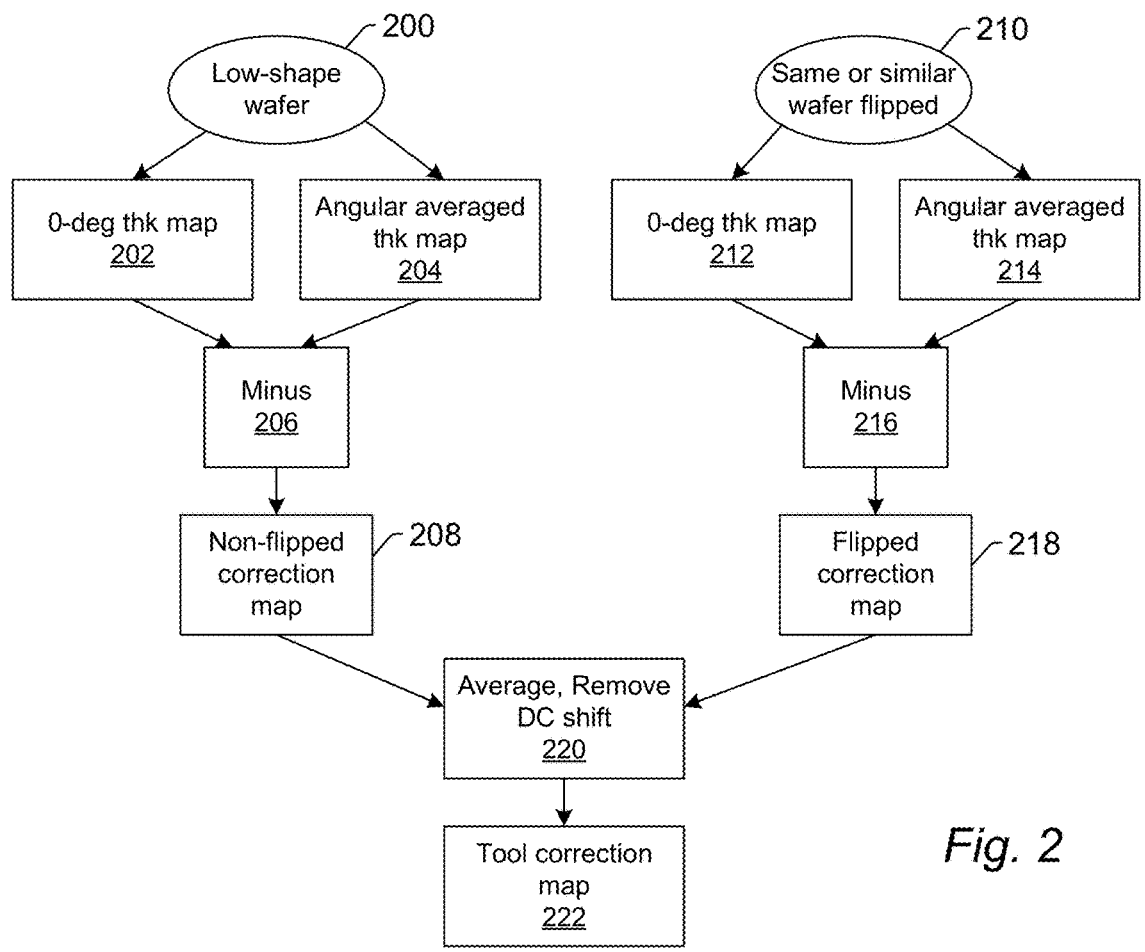
FIG. 2 is a flow chart illustrating one embodiment of a method for generating a tool correction map.

In one embodiment, the computer subsystem is configured for generating the first (non-flipped) correction map by generating a first thickness map for the first calibration wafer from the surface heights of the front and back sides of the first calibration wafer measured at a first of the multiple wafer rotation angles, generating an angular averaged thickness map for the first calibration wafer from the surface heights of the front and back sides of the first calibration wafer measured at the multiple wafer rotation angles, and subtracting the angular averaged thickness map from the first thickness map. For example, as shown in FIG. 2, low-shape wafer 200 (the first calibration wafer or "wafer A") may be measured by the metrology subsystem as described herein, and the computer subsystem may generate 0-deg thickness map 202 and angular averaged thickness map 204 from the measurements. The computer subsystem may then subtract the angular averaged thickness map from the 0-deg thickness map in step 206 thereby generating non-flipped correction map 208.

The 0-deg thickness map may therefore be generated for surface heights measured at a single wafer rotation angle. The term "0-deg thickness map" as used herein means a thickness map generated at the 0 degree wafer rotation angle or the default wafer rotation angle. In this manner, the term "0-deg thickness map" is used to more generally refer to any thickness map measured at the default wafer rotation angle. The 0-deg thickness map may otherwise be generated in any suitable manner known in the art.

The surface heights used to generate the angular averaged thickness map may include the surface heights measured at all of the wafer rotation angles at which wafer measurements were performed. In this manner, the surface heights measured at the default wafer rotation angle may be used to generate the 0-deg thickness map and, in combination with other surface heights measured at other wafer rotation angles, to generate the angular averaged thickness map. However, the surface heights measured at fewer than all of the wafer rotation angles may be used to generate the angular averaged thickness map. The angular averaged thickness map may otherwise be generated in any suitable manner known in the art. In addition, the averaged thickness map of all angles may be calculated using "partial averaging." For example, if at a certain point (like in the wafer gripper regions) some maps have void data while others have non-void data, the computer subsystem may average only the non-void data as the result.

The computer subsystem is also configured for generating a second ("flipped") correction map from the measured surface heights of the front and back sides of the second calibration wafer at the multiple wafer rotation angles. The wafer rotation angles at which the surface heights are measured for the flipped calibration wafer may be the rotation angles described above. Generating the flipped correction map may be performed as described further herein.

In some embodiments, the computer subsystem is configured for generating the second (flipped) correction map by generating a first thickness map for the second calibration wafer from the surface heights of the front and back sides of the second calibration wafer measured at a first of the multiple wafer rotation angles, generating an angular averaged thickness map for the second calibration wafer from the surface heights of the front and back sides of the second calibration wafer measured at the multiple wafer rotation angles, and subtracting the angular averaged thickness map from the first thickness map. For example, as shown in FIG. 2, wafer 210 that is the same wafer used for low-shape wafer 200 or a similar wafer, but which has been flipped, may be measured by the metrology subsystem as described herein, and the computer subsystem may generate 0-deg thickness map 212 and angular averaged thickness map 214 from the measurements. The computer subsystem may then subtract the angular averaged thickness map from the 0-deg thickness map in step 216 thereby generating flipped correction map 218. Each of these steps may be performed as described further above.

The computer subsystem is further configured for generating a tool correction map by averaging the first and second correction maps. For example, as shown in FIG. 2, the computer subsystem may average non-flipped correction map 208 and flipped correction map 218 in step 220 thereby generating tool correction map 222. The averaging may be performed in any suitable manner. The final tool correction map with a time stamp may be saved at a default location on the computer subsystem, any other computer subsystem that may have reason to use the tool correction map, or a storage medium configured as described further herein.

In some embodiments, the computer subsystem is configured for generating the tool correction map by determining a mean of results of the averaging and subtracting the mean from the results of the averaging. For example, as shown in step 220 of FIG. 2, the computer subsystem may remove DC shift from the results of the averaging performed in that step. Removing the mean (or DC shift) before generation of the tool correction map may be performed to ensure that the average thickness value in the correction map is zero so that subtracting it will not affect the mean thickness of a wafer thickness map. This subtraction step may be otherwise performed in any suitable manner known in the art.

In one embodiment, the tool correction map includes tool-specific systematic error. For example, the embodiments described herein can create a correction map that contains the tool-specific systematic error by using two opposite-shaped calibration wafers selected and configured as described further herein. In another embodiment, the tool correction map contains tool-specific, angle-dependent systematic error. For example, as described further herein, each of the angular averaged thickness maps described herein is the averaged map of thickness maps of the same wafer measured at different wafer rotation angles. Individual thickness maps at a certain rotation angle usually carry an angle-dependent systematic error visible on the map, but after averaging over maps from different rotations, the result is substantially rotation symmetric—the angle-dependent systematic error is largely suppressed. Therefore, by subtracting the 0-deg thickness map with the angular averaged map, the resulting correction map carries the angle-dependent systematic error at 0-deg.

A correction map generated by subtracting the two thickness maps described above still has a dependence on wafer due to retrace error (RTE), which is a phase error that depends on both optical aberration of the imaging system and wafer surface slope, or other error sources. However, averaging the first and second correction maps reduces dependence of the tool correction map on the first and second calibration wafers (and more specifically their individual wafer surface slope). For example, tool correction map 222 shown in FIG. 2 will have the wafer dependent error removed due to the steps shown in that figure. Averaging two correction maps from two opposite-shaped wafers is the key to the embodiments described herein. More specifically, this step gets rid of the wafer dependency and the resulting map is basically independent of the wafers used to generate the map. The resulting correction map therefore becomes essentially a signature of tool-specific error at 0 deg. Without this step, the calibration does not work because the correction map would carry a wafer signature that will mix with other wafer signatures when the correction map is applied to the data of other wafers, and it may lead to worse matching results.

The computer subsystem is configured for storing the tool correction map for use in calibrating a thickness map of a test wafer generated from surface heights of front and back sides of the test wafer measured by the metrology subsystem. For example, the computer subsystem may store the tool correction map in a wafer metrology recipe or by generating a recipe for the wafer metrology in which the tool correction map will be used. A "recipe" as that term is used herein can be generally defined as a set of instructions that can be used by a tool to perform a process on a wafer. In this manner, generating a recipe may include generating information for how a process is to be performed, which can then be used to generate the instructions for performing that process. The tool correction map that is stored by the computer subsystem may also be stored with any information that can be used to identify and/or use the tool correction map (e.g., such as a file name and where it is stored).

The computer subsystem may be configured for storing the tool correction map in any suitable computer-readable storage medium. The tool correction map may be stored in any of the results described herein and may be stored in any manner known in the art. The storage medium may include any storage medium described herein or any other suitable storage medium known in the art. After the tool correction map has been stored, the tool correction map can be accessed in the storage medium and used by any of the method or system embodiments described herein, formatted for display to a user, used by another software module, method, or system, etc. For example, the embodiments described herein may generate a metrology recipe as described above. That metrology recipe may then be stored and used by the system to measure wafers to thereby generate information (e.g., thickness information) for the wafers.

As described herein, therefore, the embodiments can be used to setup a new process or recipe. The embodiments may also be used to modify an existing process or recipe.

Figure 5:
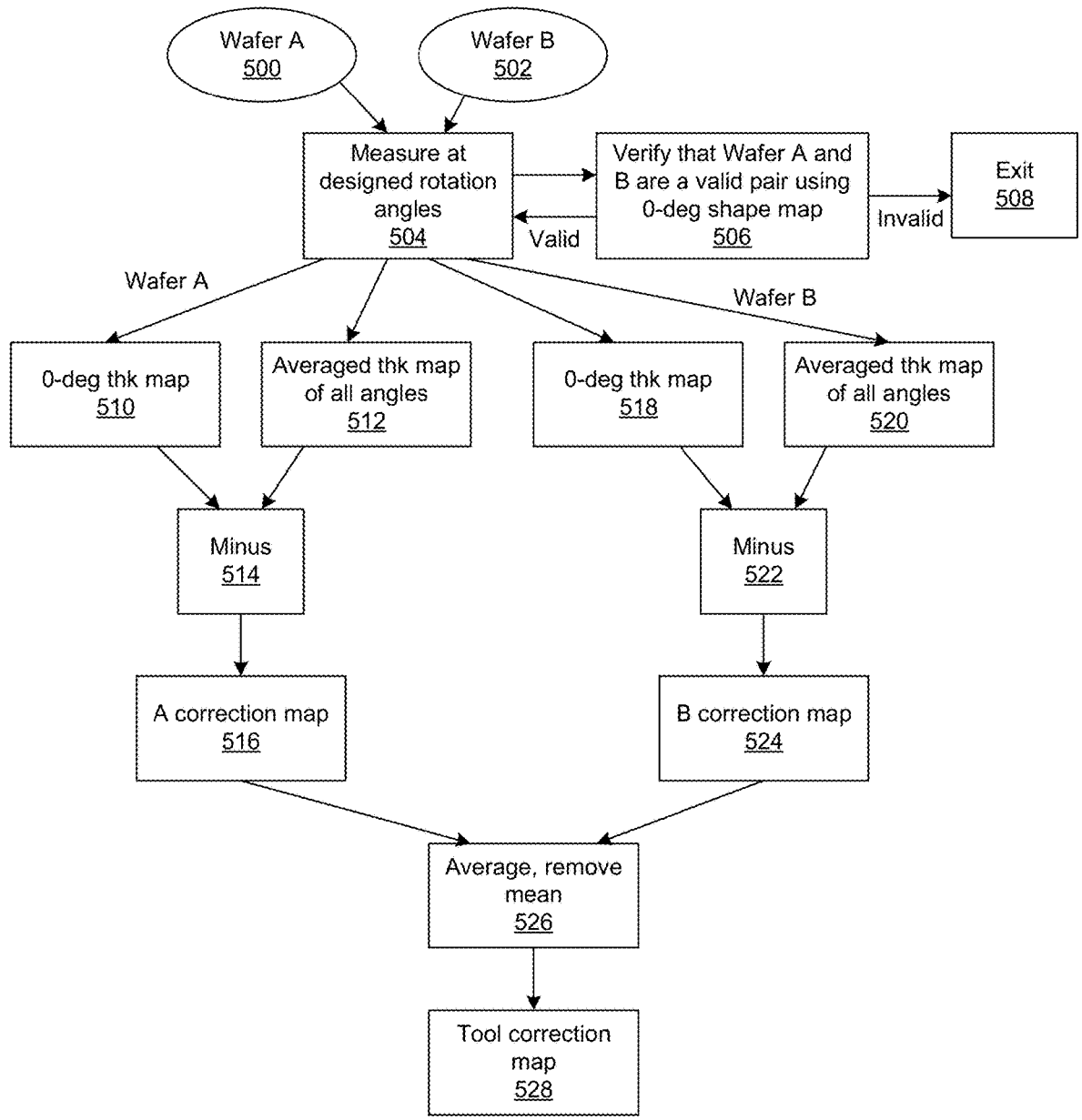
FIG. 5 is a flow chart illustrating one embodiment of a method for generating a tool correction map.

Since the calibration may be performed from time-to-time in the field, the computer subsystem may carry out a special job that measures the correction map with calibration wafers A and B. The working process of this function is shown in FIG. 5. As shown in this figure, the computer subsystem may measure wafer A (500) and wafer B (502) at designed rotation angles in step 504. The measurements of the wafers may be performed as described further herein. The computer subsystem may verify that wafers A and B are a valid pair using the 0-deg shape map in step 506. This step may be performed as described herein with respect to selecting two wafers for calibration wafers. If the computer subsystem cannot verify that wafers A and B are a valid pair in step 506, then the computer subsystem may determine that the wafers are an invalid pair and may exit the process in step 508. In this case, the system may reperform calibration wafer selection as described further herein. If the computer subsystem determines that the wafers are a valid pair, then the computer subsystem may measure wafers A and B at additional designed rotation angles in step 504, which may be performed as described herein.

The computer subsystem may generate 0-deg thickness map 510 and averaged thickness map of all angles 512 for wafer A using results of step 504 and as described further herein. The computer subsystem may also generate 0-deg thickness map 518 and averaged thickness map of all angles 520 for wafer B using results of step 504 and as described further herein. The computer subsystem may subtract averaged thickness map of all angles 512 for wafer A from 0-deg thickness map 510 for wafer A in step 514 thereby generating A correction map 516 and subtract averaged thickness map of all angles 520 for wafer B from 0-deg thickness map 518 in step 522 thereby generating B correction map 524. The computer subsystem may average the two correction maps and remove the mean from the results of the averaging in step 526 thereby generating tool correction map 528. Step 526 may be performed as described further herein.

Figure 3:
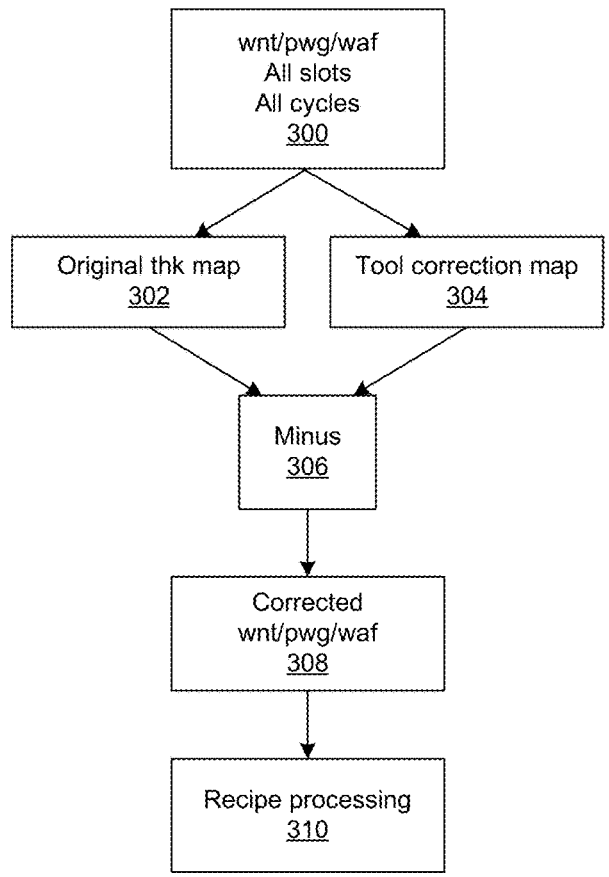
FIG. 3 is a flow chart illustrating one embodiment of a computer-implemented method for using a tool correction map generated as described herein.

In another embodiment, the computer subsystem is configured for calibrating the thickness map of the test wafer by subtracting the stored tool correction map from the thickness map thereby generating a corrected thickness map for the test wafer. In this manner, the same computer subsystem that generates the tool correction map may use the tool correction map for calibrating thickness maps of test wafers. For example, the second part of the calibration is using the tool correction map to calibrate test wafer thickness maps thereby creating calibrated thickness maps for recipe processing during job runs or offline analysis. One such method is shown in FIG. 3. As shown in step 300, the system may generate or acquire wnt/pwg/waf files (or any other standard file types) for all slots and all cycles. The computer subsystem generates original thickness map 302 for a test wafer and subtracts tool correction map 304 from the original thickness map in step 306 thereby generating corrected wnt/pwg/waf file 308 for the test wafer. The computer subsystem may then perform recipe processing 310 for the test wafer using the corrected thickness map.

Figure 7:
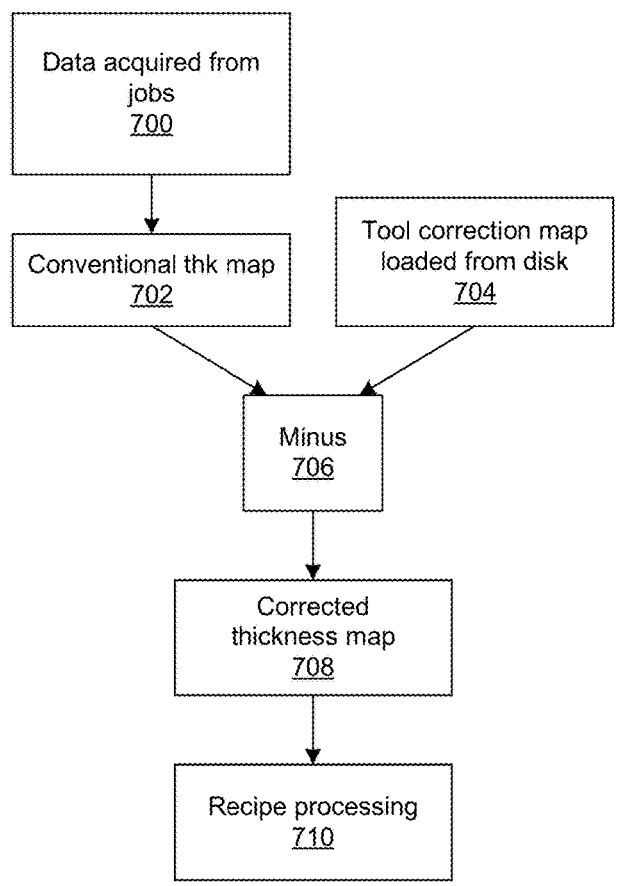
FIG. 7 is a flow chart illustrating one embodiment of a computer-implemented method for using a tool correction map generated as described herein.

Another embodiment of calibration of the wafer thickness map is shown in FIG. 7. With the tool correction map generated as described herein, a wafer thickness map created in job runs is subtracted by the tool correction map to create the corrected map before recipe processing. The computer subsystem may be configured to add this functionality to the current workflow of jobs. As shown in FIG. 7, the computer subsystem generates conventional thickness map 702 from data acquired from jobs 700, which may be performed in any suitable manner known in the art. The computer subsystem may load the tool correction map from disk, as shown in step 704, and subtract the tool correction map from the conventional thickness map in step 706 thereby generating corrected thickness map 708. The computer subsystem may then perform recipe processing 710, which may include any wafer metrology processing that can be performed on a currently used thickness map. In this case, the currently generated thickness map is replaced with the corrected thickness map in the recipe processing. In this manner, the corrected thickness map may be used in the same manner as any other currently generated thickness map.

The calibration described herein can be applied to thickness maps at different resolutions, for example, StdRes and HiRes thickness maps in WaferSight™ tools that are commercially available from KLA Corp., Milpitas, Calif.

In one embodiment, the system is one of multiple systems, and calibrating the thickness map of the test wafer with the stored tool correction map on each of the multiple systems improves matching between the multiple systems due to reduced systematic error on each of the multiple systems. For example, angular averaging calibration has been tested by the inventor and results show that it can improve ESFQR matching between tools significantly. The ESFQR matching often shows an angle-dependent pattern. This pattern is reduced by nearly half after the calibration described herein, and the mean ESFQR matching over all angular sectors is improved significantly. Based on the statistics of test results between multiple tools and multiple wafer sets, angular averaging calibration can reduce the angle-dependent pattern by about 40% on average and improve mean ESFQR matching by about 70% on average. Therefore the embodiments described herein provide a value-adding feature for wafer metrology tools, particularly for instances when substantially high accuracy in edge metrics such as ESFQR metrics is desired.

In another embodiment, the computer subsystem is configured for calibrating the thickness map of the test wafer with the stored tool correction map and calculating ESFQR of the test wafer from the calibrated thickness map and determining an additional metric for the test wafer from the thickness map of the test wafer. For example, the embodiments described herein provide a value-adding feature for wafer metrology tools, particularly for instances when substantially high accuracy in ESFQR metrics is desired. In addition, for the wnt file saved to disk, the conventional thickness map and the corrected thickness map may both be saved. In some instances, the corrected thickness map is calculated and used only for ESFQR calculation during recipe processing. Other metrics may be untouched by the calibration, and currently used recipe processing may be modified for this functionality (e.g., so that one metric is determined using the corrected thickness map and another metric is calculated using the uncorrected thickness map). In this manner, the ESFQR recipe may be revised and separated from other metrics.

The computer subsystem may be configured to store the corrected (calibrated) thickness maps for the test wafers and/or any results of recipe processing performed using the corrected thickness maps and optionally the uncorrected thickness maps. The results of the recipe processing may be generated by the computer subsystem in any suitable manner, and may have any suitable form or format such as a standard file type.

Results and information generated by performing the measurements on the wafers may be used in a variety of manners by the embodiments described herein and/or other systems and methods. Functions that can be performed using such information include, but are not limited to, altering a process such as a fabrication process or step that was or will be performed on the test wafers or other wafers in a feedback or feedforward manner. For example, the computer subsystem may be configured to determine one or more changes to a process that was performed on the test wafers measured as described herein and/or a process that will be performed on the test wafers based on the corrected thickness maps generated for the test wafers. The changes to the process may include any suitable changes to one or more parameters of the process. The computer subsystem preferably determines those changes such that any unacceptable thickness variations can be prevented on other wafers on which the revised process is performed, the wafer thickness variations can be corrected or eliminated in another process performed on the wafers, the wafer thickness variations can be compensated for in another process performed on the wafers, etc. The computer subsystem may determine such changes in any suitable manner known in the art.

Those changes can then be sent to a semiconductor fabrication system (not shown) or a storage medium (not shown) accessible to the computer subsystem and the semiconductor fabrication system. The semiconductor fabrication system may or may not be part of the system embodiments described herein. For example, the computer subsystem and/or metrology subsystem described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a sawing tool, an edge grinding tool, a lapping tool, a polishing tool, and the like.

Each of the embodiments of the system described above may be combined together into one single embodiment. In other words, unless otherwise noted herein, none of the system embodiments are mutually exclusive of any other system embodiments.

The embodiments described herein provide a number of advantages for bare wafer metrology over currently used systems and methods. For example, the calibration described herein can significantly improve the accuracy of ESFQR values measured on wafer metrology tools or generally metrology devices using dual Fizeau interferometers. The systematic error can be reduced by 40% to 70% compared with currently used methods and systems, which leads to much better tool matching performance.

The advantages provided by the embodiments described herein are enabled by a number of important differences between the embodiments and the currently used methods and systems. For example, the embodiments described herein use a twin wafer pair and multi-angle measurements to generate a thickness correction map that contains tool-specific systematic error. The embodiments described herein also advantageously reduce systematic error by calibrating a measured thickness map with the tool correction map.

Another embodiment relates to a computer-implemented method for generating a tool correction map. The method includes measuring surface heights of front and back sides of first and second calibration wafers at multiple wafer rotation angles with a metrology subsystem (e.g., step 504 in FIG. 5). The first and second calibration wafers are low-shape wafers having opposite shapes from each other as seen by the metrology system (e.g., slot 9 and 10 wafers whose shape maps are shown in FIGS. 4 and 6). The method also includes generating a first ("non-flipped") correction map from the measured surface heights of the front and back sides of the first calibration wafer at the multiple wafer rotation angles (step 208 in FIG. 2). In addition, the method includes generating a second ("flipped") correction map from the measured surface heights of the front and back sides of the second calibration wafer at the multiple wafer rotation angles (step 218 in FIG. 2). The method further includes generating a tool correction map (222, FIG. 2) by averaging the first and second correction maps (step 220 in FIG. 2) and storing the tool correction map for use in calibrating a thickness map of a test wafer generated from surface heights of front and back sides of the test wafer measured by the metrology subsystem (step 306 in FIG. 3 and step 706 in FIG. 7). The steps are performed by a computer subsystem (36, FIG. 1), which may be configured according to any of the embodiments described herein.

Each of the steps of the method may be performed as described further herein. The method may also include any other step(s) that can be performed by the metrology subsystem and/or computer subsystem described herein. In addition, the method described above may be performed by any of the system embodiments described herein.

Figure 8:
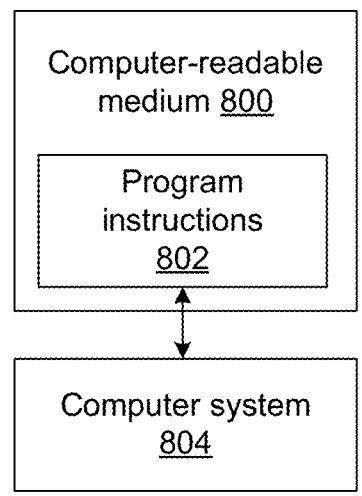
FIG. 8 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for generating a tool correction map. One such embodiment is shown in FIG. 8. In particular, as shown in FIG. 8, non-transitory computer-readable medium 800 includes program instructions 802 executable on computer system 804. The computer-implemented method may include any step(s) of any method(s) described herein.

Program instructions 802 implementing methods such as those described herein may be stored on computer-readable medium 800. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMID Extension) or other technologies or methodologies, as desired.

Computer system 804 may be configured according to any of the embodiments described herein.

Further modifications and alternative embodiments of various aspects of the invention will be apparent to those skilled in the art in view of this description. For example, methods and systems for generating a tool correction map are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain attributes of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A system configured for generating a tool correction map, comprising:
a metrology subsystem configured for measuring surface heights of front and back sides of first and second calibration wafers at multiple wafer rotation angles, wherein the first and second calibration wafers are low-shape wafers having opposite shapes from each other as seen by the metrology subsystem; and
a computer subsystem configured for:
generating a first correction map from the measured surface heights of the front and back sides of the first calibration wafer at the multiple wafer rotation angles;
generating a second correction map from the measured surface heights of the front and back sides of the second calibration wafer at the multiple wafer rotation angles;
generating a tool correction map by averaging the first and second correction maps; and
storing the tool correction map for use in calibrating a thickness map of a test wafer generated from surface heights of front and back sides of the test wafer measured by the metrology subsystem.

2. The system of claim 1, wherein the tool correction map contains tool-specific systematic error.

3. The system of claim 1, wherein the tool correction map contains tool-specific, angle-dependent systematic error.

4. The system of claim 1, wherein averaging the first and second correction maps reduces dependence of the tool correction map on the first and second calibration wafers.

5. The system of claim 1, wherein the system is one of multiple systems, and wherein calibrating the thickness map of the test wafer with the stored tool correction map on each of the multiple systems improves matching between the multiple systems due to reduced systematic error on each of the multiple systems.

6. The system of claim 1, wherein the low-shape wafers have shape 6σ less than 9500 nm, and 6σ of a sum of shape maps of the first and second calibration wafers is less than 2200 nm.

7. The system of claim 1, wherein the first and second calibration wafers are standard bare wafers.

8. The system of claim 1, wherein the computer subsystem is further configured for selecting the first and second calibration wafers from a single batch of wafers and based on shape of the wafers in the single batch.

9. The system of claim 1, wherein the computer subsystem is further configured for selecting the first and second calibration wafers by determining a difference shape map from shape maps for different pairs of wafers and selecting one of the different pairs with 6σ of the difference shape map less than 1500 nm.

10. The system of claim 1, wherein the computer subsystem is further configured for verifying a pair of wafers selected as the first and second calibration wafers by determining a sum of shape maps for the pair of wafers after flipping one of the shape maps for one of the wafers in the pair and determining if 6σ of the sum of the shape maps for the pair of wafers is less than 2200 nm.

11. The system of claim 1, wherein the computer subsystem is further configured for generating the first correction map by generating a first thickness map for the first calibration wafer from the surface heights of the front and back sides of the first calibration wafer measured at a first of the multiple wafer rotation angles, generating an angular averaged thickness map for the first calibration wafer from the surface heights of the front and back sides of the first calibration wafer measured at the multiple wafer rotation angles, and subtracting the angular averaged thickness map from the first thickness map.

12. The system of claim 1, wherein the computer subsystem is further configured for generating the second correction map by generating a first thickness map for the second calibration wafer from the surface heights of the front and back sides of the second calibration wafer measured at a first of the multiple wafer rotation angles, generating an angular averaged thickness map for the second calibration wafer from the surface heights of the front and back sides of the second calibration wafer measured at the multiple wafer rotation angles, and subtracting the angular averaged thickness map from the first thickness map.

13. The system of claim 1, wherein the computer subsystem is further configured for generating the tool correction map by determining a mean of results of the averaging and subtracting the mean from the results of the averaging.

14. The system of claim 1, wherein the computer subsystem is further configured for calibrating the thickness map of the test wafer by subtracting the stored tool correction map from the thickness map thereby generating a corrected thickness map for the test wafer.

15. The system of claim 1, wherein the metrology subsystem is further configured for measuring the surface heights of the front and back sides of the first and second calibration wafers at a standard resolution.

16. The system of claim 1, wherein the computer subsystem is further configured for generating shape maps for the first and second calibration wafers and displaying to a user the shape maps for the first and second calibration wafers and one or more of a difference shape map generated from the shape maps for the first and second calibration wafers and a sum of the shape maps for the first and second calibration wafers.

17. The system of claim 1, wherein the computer subsystem is further configured for calibrating the thickness map of the test wafer with the stored tool correction map and calculating edge surface flatness quotient range of the test wafer from the calibrated thickness map and determining an additional metric for the test wafer from the thickness map of the test wafer.

18. A non-transitory computer-readable medium, storing program instructions executable on a computer system for performing a computer-implemented method for generating a tool correction map, wherein the computer-implemented method comprises:

measuring surface heights of front and back sides of first and second calibration wafers at multiple wafer rotation angles with a metrology subsystem, wherein the first and second calibration wafers are low-shape wafers having opposite shapes from each other as seen by the metrology subsystem;

generating a first correction map from the measured surface heights of the front and back sides of the first calibration wafer at the multiple wafer rotation angles;

generating a second correction map from the measured surface heights of the front and back sides of the second calibration wafer at the multiple wafer rotation angles;

generating a tool correction map by averaging the first and second correction maps; and storing the tool correction map for use in calibrating a thickness map of a test wafer generated from surface heights of front and back sides of the test wafer measured by the metrology subsystem.

19. A computer-implemented method for generating a tool correction map, comprising:

measuring surface heights of front and back sides of first and second calibration wafers at multiple wafer rotation angles with a metrology subsystem, wherein the first and second calibration wafers are low-shape wafers having opposite shapes from each other as seen by the metrology subsystem;

generating a first correction map from the measured surface heights of the front and back sides of the first calibration wafer at the multiple wafer rotation angles;

generating a second correction map from the measured surface heights of the front and back sides of the second calibration wafer at the multiple wafer rotation angles;

generating a tool correction map by averaging the first and second correction maps; and storing the tool correction map for use in calibrating a thickness map of a test wafer generated from surface heights of front and back sides of the test wafer measured by the metrology subsystem, wherein generating the first correction map, the second correction map, and the tool correction map and storing the tool correction map are performed by a computer subsystem.

* * * * *